(12) United States Patent
Birkle et al.

(10) Patent No.: US 7,302,844 B2
(45) Date of Patent: Dec. 4, 2007

(54) MEASUREMENT ELEMENT FOR DETERMINING A FLOW RATE

(75) Inventors: Siegfried Birkle, Höchstadt (DE); Thomas Bosselmann, Marloffstein (DE); Michael Willsch, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 190 days.

(21) Appl. No.: 10/534,114

(22) PCT Filed: Sep. 26, 2003

(86) PCT No.: PCT/DE03/03221

§ 371 (c)(1),
(2), (4) Date: May 6, 2005

(87) PCT Pub. No.: WO2004/042326

PCT Pub. Date: May 21, 2004

(65) Prior Publication Data

US 2006/0117844 A1 Jun. 8, 2006

(30) Foreign Application Priority Data

Nov. 6, 2002 (DE) .................. 102 51 701

(51) Int. Cl.
*G01F 1/68* (2006.01)
(52) U.S. Cl. .................. 73/204.23; 73/861.11
(58) Field of Classification Search ............ 73/204.23, 73/861.17, 861.12, 861.23, 861.11
See application file for complete search history.

(56) References Cited

U.S. PATENT DOCUMENTS

| 5,533,329 | A | | 7/1996 | Ohyama et al. |
| 5,793,216 | A | * | 8/1998 | Constant ..................... 324/639 |
| 6,634,238 | B2 | * | 10/2003 | Budmiger ................ 73/861.17 |
| 6,865,956 | B2 | * | 3/2005 | Yamamoto ............... 73/861.12 |

FOREIGN PATENT DOCUMENTS

| DE | 1 220 147 | 6/1966 |
| DE | 38 16 045 A1 | 5/1989 |
| DE | 44 17 199 A1 | 11/1994 |
| DE | 195 44 011 A1 | 5/1997 |
| DE | 298 21 223 U1 | 4/1999 |
| DE | 199 50 111 C1 | 2/2001 |
| EP | 0 392 897 A2 | 10/1990 |
| SU | 1 508 170 A1 | 9/1989 |
| WO | WO 00/11317 A1 | 3/2000 |

OTHER PUBLICATIONS

German Search Report for Application No. 102 51 701.0-52 dated Feb. 27, 2004.
International Search Report for Application No. PCT/DE 03/03221; dated Feb. 15, 2005.

* cited by examiner

*Primary Examiner*—Jewel Thompson
(74) *Attorney, Agent, or Firm*—Staas & Halsey LLP

(57) ABSTRACT

The flow rate of a fluid flowing around a measuring element is measured using a guide for guiding an electromagnetic wave along the longitudinal extension thereof and at least one electric heating element that is placed adjacent to the guide. The guide can be heated by the heating element. An electromagnetic wave, which can be launched into the guide, can be influenced according to the temperature of the guide that is dependent on the flow rate of the fluid.

24 Claims, 3 Drawing Sheets

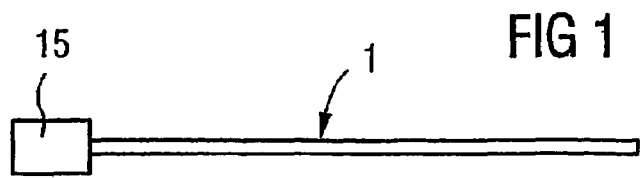
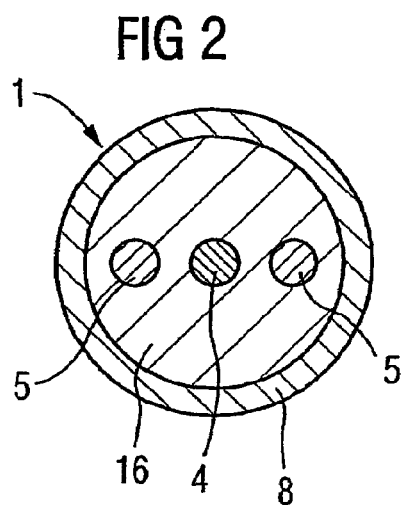
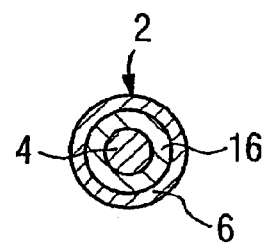
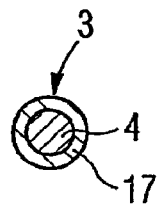
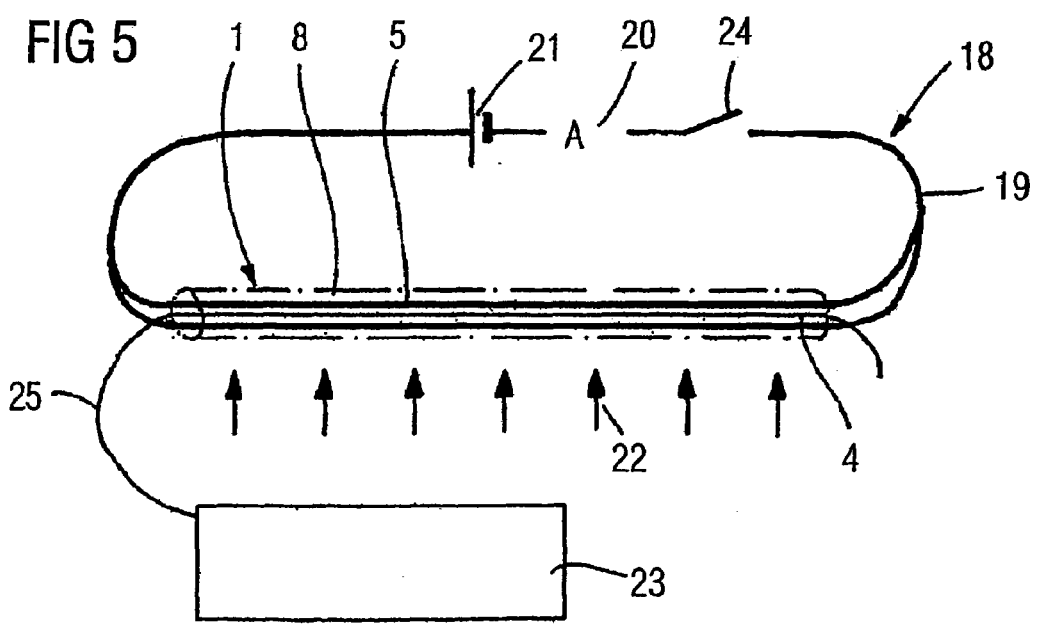

US 7,302,844 B2

MEASUREMENT ELEMENT FOR DETERMINING A FLOW RATE

CROSS REFERENCE TO RELATED APPLICATIONS

This application is based on and hereby claims priority to German Application No. 102 51 701.0 filed on 6 Nov. 2002, the contents of which are hereby incorporated by reference.

BACKGROUND OF THE INVENTION

1. Field of the Invention

The present invention relates to a measurement element for determination of a flow rate of a fluid which is flowing around the measurement element, using a conductor for carrying an electromagnetic wave along its longitudinal extent and at least one electrical heating element, which is arranged adjacent to the conductor. The invention also relates to a technical steam machine having a measurement element according to the invention, and to a method for determination of a flow rate of a fluid.

2. Description of the Related Art

A large number of flowmeters are known from the related art. By way of example, volume flowmeters are used to determine a flow in which the amount of fluid flowing through a predetermined line cross section in a specific time is measured. For this purpose, volume flowmeters have two oval wheels which are arranged in a measurement chamber and roll against one another, with the flow rate being determined from the rotation speed. Furthermore, effective pressure measurements are known, in which a predetermined constriction is provided in a line cross section and the flow rate is determined from a pressure difference upstream of the constriction and in the constriction. Inductive or ultrasound flowmeters are also known.

The already known methods have the disadvantage that their usage capabilities are restricted, particularly when access to a flow channel is difficult, or when stringent requirements have to be satisfied with regard to the physical and/or chemical load. The measurement elements from the related art are also inaccurate for large flow cross sections since they allow only a point measurement and cannot detect flow profile discrepancies transversely with respect to the flow direction.

Furthermore, the known measurement methods for determination of flow rates are largely unsuitable for sufficiently accurately determining the flow rate and/or the distribution of the flow rate transversely with respect to the flow direction in a flow channel of a technical steam machine. In particular, the determination process is made more difficult by the fact that the materials which can be used in the flow channel of a technical steam machine are subject to stringent requirements with regard to the chemical and/or physical load. Thermocouple arrangements of a complex design are therefore used in gas turbines in order to determine the flow rate at at least a number of predetermined points. This is based on the principle that the flow in the flow channel correspondingly cools down a heated thermocouple.

SUMMARY OF THE INVENTION

The present invention is thus based on an object of providing a measurement element as well as a method by which a flow profile transversely with respect to the flow direction can be determined.

According to an aspect of the invention, the object stated above is achieved by a measurement element for determination of a flow rate of a fluid which is flowing around the measurement element, by a conductor for carrying an electromagnetic wave along its longitudinal extent and at least one electrical heating element, which is arranged adjacent to the conductor and by which heat can be applied to the conductor, wherein an electromagnetic wave which can be injected into the conductor can be influenced as a function of the temperature of the conductor, which is dependent on the flow rate of the fluid.

It is thus for the first time possible to determine the flow rate along the longitudinal extent of the measurement element from an influence of the electromagnetic wave by the temperature of the conductor. The measurement element can be heated via the electrical heating element, resulting in a temperature distribution in the longitudinal extent of the measurement element corresponding to the local flow rate. The measurement element according to this aspect the invention is thus suitable for determination of a large number of local flow rates using only a single measurement element. The effects of measurement elements on the flow channel, for example in a technical steam machine, can thus be considerably reduced. Furthermore, the present invention makes it possible to reduce the number of measurement elements and measurement element evaluation systems required for this purpose. The avoidance of moving parts in conjunction with the reduction in the number of parts in comparison to known solutions furthermore allows the measurement arrangement to be highly reliable. The measurement element according to an aspect of the invention can be used advantageously particularly for safety-relevant measurement devices or for measurement devices in the large machine field, in which measurement accuracy and measurement reliability are particularly important. Depending on the physical and/or chemical requirements, the measurement element may, for example, be formed from a ceramic material or from a plastic. By way of example, the heating element may be integrated in the measurement element, for example in the form of a heating wire. However, the heating element may also be formed from a tube through which a heating fluid is passed in order to heat the measurement element. The present invention also makes it possible to provide a measurement element by which flow rate changes can be determined quickly, by virtue of its low thermal capacity.

The invention also proposes that the measurement element be in the form of a rod. The measurement element is advantageously simple to install and may, for example, be inserted into the flow channel through an opening. It is also possible to maintain the measurement element with little installation effort. For this purpose, the appropriate attachments are released, and the measurement element is pulled out through the opening. In addition, of course, the measurement element may have any other desired shape. For example, the measurement element may be circular in order to determine a flow profile at a specific predetermined radius in a flow channel. However, it may also be in the form of an Archimedes screw, in order to determine a flow profile as a function of the radius and the circumferential angle of a flow.

A further refinement proposes that the measurement element be elastic. This advantageously allows the measurement element to be preshaped quickly, depending on the purpose, thus making it possible to reduce the number of different measurement element shapes. Storage costs can be saved.

A further refinement proposes that the conductor be an optical waveguide. The measurement element can advantageously be produced to be very compact and in a cost-effective manner. The optical waveguide is preferably a glass fiber. Use of a glass fiber may be envisaged in particular for high physical and/or chemical loads. The glass fiber may be highly temperature-resistant, so that it is particularly suitable, for example, for use in a technical steam machine. However, depending on the application, the optical waveguide may also be formed by a plastic fiber.

It is also proposed that the heating element be formed by an electrically conductive coating on the conductor. This allows the physical shape of the measurement element to be further simplified. The heating element can thus be connected integrally and in a simple manner to the conductor thus allowing not only cost-effective production but also allowing the heating element to provide a protective function for the conductor. The conductive coating may, for example, be formed from a metal such as tungsten or else from an alloy such as steel or the like.

It is also proposed that the heating element have a constant electrical resistance per unit length. This advantageously makes it possible to apply heat uniformly over the longitudinal extent of the measurement element. For the purposes of this application, a resistance per unit length should be understood as meaning the electrical resistance per unit length.

It is also proposed that the resistance per unit length be largely independent of the temperature in the operating temperature range. This can be achieved by the heat supplied along the longitudinal extent of the measurement element being essentially independent of the actual local temperature. The measurement accuracy and the reliability of the measurement can be increased. For this purpose, by way of example, the heating element may be formed from a material such as constantan or the like.

A further refinement of the present invention proposes that the heating element be formed by a heating conductor in the form of a heating loop. This advantageously makes it possible for the measurement element to be connected to an appropriate unit for supplying the heating element at only one end. The heating loop may, for example, be in the form of an elongated coil which surrounds the measurement element, with the two connections of the heating conductor being arranged at one end of the measurement element. In addition, however, the heating element may also be formed by individual conductors which run parallel and are connected to one another in series such that both connections are arranged at one end of the measurement element. Appropriate arrangement of the heating conductor makes it possible to apply heat essentially uniformly to the measurement element.

One advantageous development proposes that the measurement element have a sheath. The measurement element may, for example, be protected against chemical loading in this way. Furthermore, the sheath allows mechanical protection, for example during assembly.

It is also proposed that the sheath be formed from a ceramic material. The ceramic sheath advantageously allows a measurement element to be formed for a high temperature load.

In addition, the invention proposes that the sheath be formed by a metal sleeve. This advantageously allows the measurement element to be protected, for example, against electrostatic charging, since the metal sleeve can be connected to a ground potential.

The invention also proposes that the metal sleeve at the same time form the heating element. Components and costs can be further reduced.

In addition, the invention proposes a method for determination of a flow rate of a fluid by a measurement element according to an aspect of the invention around which the fluid flows, with an electromagnetic wave being injected into a conductor, which carries the wave, of the measurement element, with the electromagnetic wave being influenced by the measurement element as a function of its local temperature, which corresponds to the flow rate of the fluid, with the influence of the electromagnetic wave being determined, and with the flow rate of the fluid along the longitudinal extent of the measurement being determined from this. The invention advantageously allows a profile of the flow rate to be determined along the measurement element. By way of example, the electromagnetic wave may be a coherent wave from a laser.

The invention also proposes that the electromagnetic wave be formed by an electromagnetic pulse. This advantageously allows energy to be saved and the measurement accuracy to be increased. The electromagnetic pulse may be produced, for example, by a pulsed laser which is injected into the conductor for the electromagnetic wave via suitable known coupling means.

The invention also proposes that the measurement element be heated by a heating element over its longitudinal extent during the measurement. The flow rate can advantageously be determined from the decrease in temperature caused by the fluid flow, since the electromagnetic wave is influenced as a function of the temperature. In particular, the amount of heat applied is constant. For the purposes of this description, the amount of heat applied should be understood as being the amount of heat supplied per unit length.

In order to make it possible to ensure that the amount of heat applied is constant over time, the invention proposes that a constant electric current be applied to the heating element. In accordance with Ohm's law, this allows constant application of heat to be achieved but particularly in the case of a resistance profile which is constant over the longitudinal extent of the measurement element. In addition, of course, the heating element may also be fed with an alternating current. In particular, the heating effect of the heating element can be influenced by variation of the frequency by varying the frequency in a range in which current displacement effects occur.

One advantageous development of the method according to the invention proposes that two or more measurements be carried out with a different amount of heat applied. This allows the measurement accuracy to be increased further.

A further refinement of the present method proposes that the flow rate of the fluid be determined along the longitudinal extent of the measurement element from the difference between at least two measurements with a different amount of heat applied. A differential measurement advantageously allows superimposed disturbance effects to be reduced. The accuracy of the measurement result can be further increased.

The invention also proposes that a gas flow in a gas turbine be used as the fluid. The complexity for determination of the flow rate in a gas turbine can advantageously be reduced by, for example, the capability to reduce the number of measurement elements and their evaluation units. Furthermore, a measurement element according to an aspect of the invention can be cost-effectively matched to the physical and/or chemical requirements in the flow channel of a gas turbine. The flow distribution in the cross section of a flow channel can be measured accurately.

Furthermore, the invention proposes a technical steam machine having rotor blades which are arranged on a rotor shaft which is mounted in a housing such that it can rotate, and having stator blades which are arranged such that they are rotationally fixed, in which a measurement element according to an aspect of the invention, which is arranged in a flow channel in the technical steam machine, is arranged for measurement of the fluid flow rate. This makes it possible to save a known measurement arrangement with a large number of measurement elements from the related art. It is also possible to use the measurement element according to an aspect of the invention to determine a technical steam rate profile along the longitudinal extent of the measurement element. This advantageously makes it possible to determine local flow rate changes which it would not be possible to detect, or only with a high degree of complexity, by a conventional measurement, since measurements are carried out only at discrete points in this case. Dangerous states, for example in the blade area, can be determined in good time, before they cause damage to the blades. Overall, this allows a considerable improvement to be achieved in the monitoring of the technical steam machine. The technical steam machine may, for example, be a steam turbine, although it may also and in particular be a gas turbine. Particularly in the case of large machines, monitoring is particularly important since faults can lead to failures with high consequential costs and to faults with a high hazard potential. The operating reliability of a technical steam machine can thus be increased.

The invention proposes that the measurement element be arranged radially with respect to an axis of the rotor shaft in the flow channel. The flow rate can advantageously be determined as a function of the radius from the axis of the rotor shaft. Two or more measurement elements may, of course, also be provided in the flow channel, in order to make it possible to determine the flow rate at different circumferential positions in the flow channel.

Furthermore, the invention proposes that the measurement element be arranged coaxially with respect to the axis of the rotor shaft along a circular line in the flow channel. This advantageously makes it possible to determine the flow profile over the circumference in the flow channel. However, two or more measurement elements may also be arranged along circular lines with different radii, in order to make it possible to additionally determine information about the flow profile at a different distance from the axis to the rotor shaft.

The invention also proposes that two or more measurement elements be arranged axially spaced apart in the flow channel. This advantageously makes it possible to detect and evaluate axial changes in the flow rate. Two or more differently shaped measurement elements may also be used in order to obtain the desired information about the flow profile. By way of example, radial measurement elements in the form of rods can thus be combined with measurement elements arranged along a circular line in the flow channel. In particular, the invention proposes that the measurement elements be operated using a method according to an aspect of the invention.

BRIEF DESCRIPTION OF THE DRAWINGS

These and other objects and the following description of the preferred embodiments of the present invention will become more apparent and more readily appreciated from the following description of exemplary embodiments, taken in conjunction with the accompanying drawings of which:

FIG. 1 is a side view of an embodiment of a measurement element according to an aspect of the invention in the form of a rod, with a connecting plug at one end, FIG. 2 is a section through a measurement element with a glass fiber and with two heating conductors arranged parallel to it, FIG. 3 is a section through a further refinement of a measurement element with a coaxial heating element surrounding the glass fiber, FIG. 4 is a section through a further refinement of a measurement element with a heating element which is fitted directly to one surface of the glass fiber, FIG. 5 is an outline circuit diagram for a measurement arrangement for carrying out a measurement method according to an aspect of the invention.

DETAILED DESCRIPTION OF THE PREFERRED EMBODIMENT

Figure 6:
FIG. 6 is a position/temperature diagram, showing the relationship between the position and the measured associated temperature in a homogeneous flow without heating.

Reference will now be made in detail to the preferred embodiments of the present invention, examples of which are illustrated in the accompanying drawings, wherein like reference numerals refer to like elements throughout.

FIG. 1 shows a side view of a measurement element 1 according to an aspect of the invention with a plug connector 15, which is fitted to one end of the measurement element 1, for connection of the measurement element to an evaluation unit, which is not illustrated in any more detail. The measurement element 1 is designed to be elastic in the form of a rod so that the geometric shape can be matched to the predetermined requirements. FIG. 2 shows a first refinement of the measurement element 1 according to the invention with two heating elements 5 between which a glass fiber (4) is arranged centrally. The arrangement is embedded in a ceramic material 16, which is itself surrounded by a passivating sheath 8.

Figure 13:
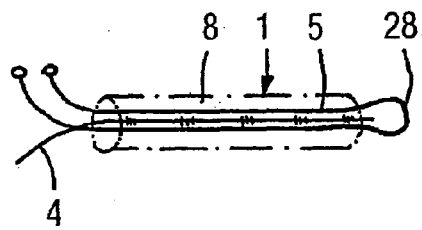
FIG. 13 is a further refinement of a measurement element according to an aspect of the invention.

FIG. 13 shows a schematic view of the measurement element 2, in which the two heating wires 5 are connected in series to one another via an electrical connection 28 at one end of the measurement element 1. In this refinement, contact can thus advantageously be made completely with the measurement element 1 at one end. The second end is freely available thus allowing particularly simple installation and/or handling of the measurement element 1. A number of measurement points are indicated in the measurement element 1, and are each in the form of a fiber Bragg grating sensor. A fiber Bragg grating sensor allows a measurement variable, in this case a temperature and thus indirectly the flow rate, to be determined very well by optical means.

FIG. 3 shows a further refinement of a measurement element 2 according to the invention with a glass fiber 4 which is surrounded by a ceramic material 16. A heating element 6 completely surrounds the circumference of the measurement element 2 and at the same time forms a sheath.

FIG. 4 shows a section through a third refinement of the present invention, in which the glass fiber 4 has a metal layer 17 vapor-deposited on it, which at the same time forms a sheath as well as a heating element. This refinement according to the invention is distinguished by elasticity, so that the physical extent of the measurement element 3 can be adapted as required. Furthermore, the measurement element 3 according to an aspect of the invention is distinguished by a particularly simple production method, in which the glass fiber 4 is coated with the desired electrical conductor using a conventional, known type of coating process.

The heating elements 5 and 6 used in the refinements are preferably formed from a metal or from a metal alloy. By way of example, steel, copper, aluminum, bronze, constantan or the like may be used, depending on the physical and/or chemical load. For high-temperature applications, for example in the flow channel of a gas turbine, a coating with a metal such as tungsten or the like is preferable. For applications at lower temperatures in a chemically aggressive environment, it is also possible to use, for example, conductive polymers. Furthermore, the refinement illustrated in FIG. 4 is distinguished in that it has a particularly low thermal capacity in comparison to the two other versions, so that changes in the flow rate over time can be detected quickly. In the exemplary embodiments described here, the heating element 5, 6 in each case has a constant electrical resistance per unit length. In particular, the resistance per unit length is largely independent of the temperature in the operating temperature range. Application of a constant current or an alternating current with a constant root mean square value to the heating element 5, 6 thus leads to heat being produced uniformly over the length of the heating element, so that the measurement element has heat applied to it uniformly over its longitudinal extent.

FIG. 5 shows an outline circuit diagram for a measurement configuration 18 according to an aspect of the invention. A measurement element 1 is connected at each of its ends, with its heating element 6, to an electrical power source 21 via a circuit 19, a switching element 24 and an ammeter 20. In this refinement, the electrical power source 21 is a current source via which a constant direct current can be preset. Furthermore, the glass fiber 4 of the measurement element 1 is connected via an optical connecting fiber 25 to an evaluation unit 23. A fluid flow 22 flows around the measurement element 1 and has a different flow rate along the longitudinal extent of the measurement element 1, indicated by the arrows of different length. According to an aspect of the invention, the evaluation unit determines the flow rate of the fluid by injecting a laser pulse into the glass fiber 4 of the measurement element 1 via the optical connecting fiber 25. The measurement makes use of the effect that an electromagnetic wave which is injected into a glass fiber is scattered by the fiber as it passes through. Some of the scattered light is scattered in the opposite direction, so that it can be detected at the input of the glass fiber. The electromagnetic wave that is scattered back is preferably detected at a time at which no electromagnetic wave is being injected into the glass fiber. The temperature of the glass fiber can be deduced from the temperature dependency of this effect. The signal that is scattered back includes various components of different suitability for the measurement requirements. For example, the signal that is scattered back contains a Raman-scattered component, which, however, allows only a poor spatial resolution to be achieved. The fiber Bragg grating technology is thus used in the present case, which allows high spatial resolution to be achieved as is required in particular for use for temperature measurement in machines.

The laser pulse for this purpose is produced in a known manner using equipment from the related art. The measurement element 1 assumes a local temperature as a function of the local flow rate 22. A portion of the laser pulse is scattered back into the glass fiber 4, depending on the temperature. This signal that is scattered back is supplied via the optical connecting fiber 25 to the evaluation unit 23 which uses it to determine the temperature distribution along the measurement element, with the flow rate of the fluid being determined from the temperature distribution.

When the switch 24 is open, it is possible to use this apparatus to determine the temperature of the fluid flow 22 along the measurement element 1. The switching element 24 is then closed, and heat is applied to the measurement element 12. The flow rate of the fluid along the measurement element 1 is now determined by the new measurement. In order to improve the measurement accuracy, the current produced by the electrical power source 21 can be varied. The measurement can thus be repeated with different heat loads, with the flow rate being deduced from the differences. The switch may be either a mechanical switch or else an electronic switch, such as those known in a wide number of types and forms from the related art. However, the switch may also be formed integrally with the power source 21, in which case it is possible to provide not only a switching function but also a control function for the current.

Figure 7:
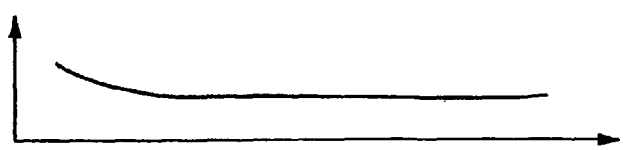
FIG. 7 is a position/temperature diagram as shown in FIG. 6, but with heat being supplied.
Figure 8:
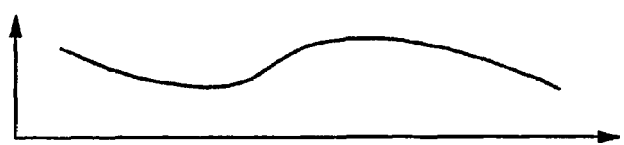
FIG. 8 is a position/temperature diagram as shown in FIG. 7, with the flow being inhomogeneous.
Figure 9:
FIG. 9 is a position/flow rate diagram, which illustrates the flow rate distribution based on FIG. 8.

FIGS. 6 to 8 show position/temperature diagrams, with the temperature profile illustrated in FIG. 6 along the longitudinal extent of the measurement element 1, 2, 3 being that for a homogeneous flow with no heat applied. In contrast, FIG. 7 shows a profile like that in FIG. 6, but with heat additionally being applied to the measurement element 1, 2, 3. FIG. 8 shows a temperature distribution on the measurement element 1, 2, 3, which is dependent on the flow profile represented by the different flow arrows 22 in FIG. 5. This clearly shows the increased temperature in the area in which the reduced flow is shown in FIG. 5. FIG. 9 shows a speed/position diagram, illustrating the flow rate, as determined by the evaluation unit 23, as the result of the measurement shown in FIG. 8.

Figure 12:
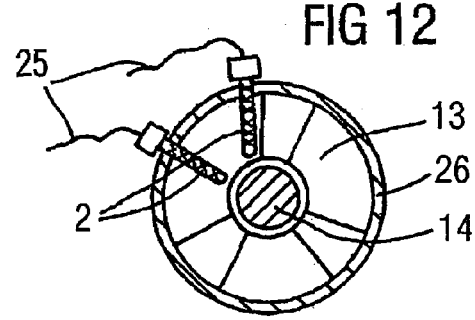
FIG. 12 is a section through the turbine illustrated in FIG. 10, along a line XII—XII.
Figure 10:
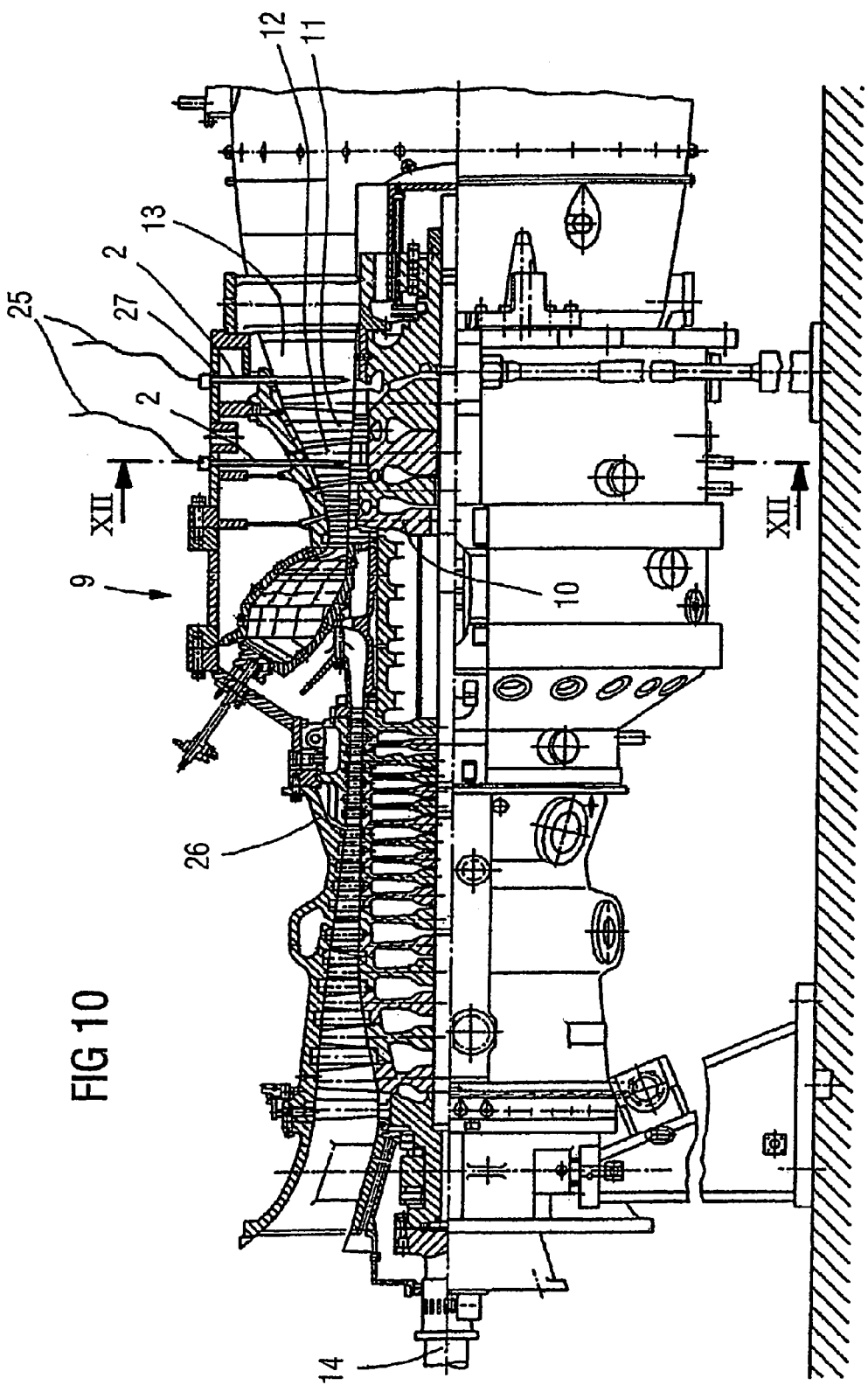
FIG. 10 is a section through a gas turbine with a measurement element according to an aspect of the invention.

FIG. 10 shows a partial section through a gas turbine 9 with rotor blades 11, which are arranged on a rotor shaft 10 that is mounted in a housing 26 such that it can rotate, and with stator blades 12 which are arranged such that they are rotationally fixed. A measurement element 2 projects through an opening 27 into a flow channel 13 in the gas turbine 9. The measurement element is arranged radially with respect to an axis 14 of the rotor shaft 10 in the flow channel 13. A second measurement element 2 is arranged in the flow channel of the gas turbine 9 in the same way, but axially offset with respect to the first measurement element 2. FIG. 12 shows a section through the turbine 9. Two measurement elements 2 are arranged radially in the flow channel 13 of the turbine 9, and can be used to determine both the temperature of the gas flow in the flow channel 13 and the speed.

Figure 11:
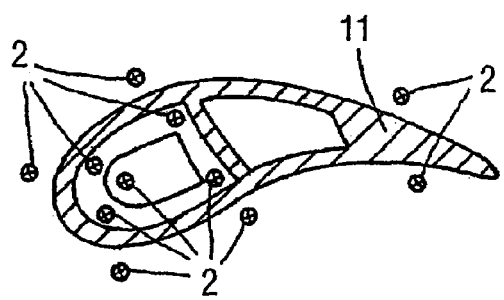
FIG. 11 is a section through a turbine stator blade with measurement elements according to an aspect of the invention.

FIG. 11 shows a section through a stator blade 11 of the turbine 9, with measurement elements 2 being arranged parallel to a radial axis of the stator blades 11.

The exemplary embodiments illustrated in the figures are intended only to explain the invention, and are not restrictive in themselves. Thus, in particular, the type of measurement element, in particular its geometric shape, may vary without departing from the protective scope of the invention. Furthermore, of course, two or more elements may also be interconnected in order to make it possible to investigate specific changes in the flow rate in more detail.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A measurement element for determination of a flow rate of a fluid which is flowing around said measurement element in a flow channel, comprising:
   an optical waveguide carrying an electromagnetic wave along a longitudinal extent thereof;
   at least two fiber Bragg grating sensors in said optical waveguide; and
   at least one electrical heating element, arranged adjacent to and applying heat to said optical waveguide, the electromagnetic wave carried by said optical waveguide being influenced, dependent on the flow rate of the fluid, as a function of temperature of said optical waveguide where said fiber Bragg grating sensors are located.

2. The measurement element as claimed in claim 1, wherein said measurement element has a form of a rod.

3. The measurement element as claimed in claim 2, wherein said measurement element is elastic.

4. The measurement element as claimed in claim 3, wherein said heating element is formed from metal.

5. The measurement element as claimed in claim 4, wherein said heating element is a heating conductor formed in a loop.

6. The measurement element as claimed in claim 4, wherein said heating element is formed by an electrically conductive coating on said optical waveguide.

7. The measurement element as claimed in claim 6, wherein said heating element has a constant electrical resistance per unit length.

8. The measurement element as claimed in claim 7, wherein the resistance per unit length is largely independent of the temperature in an operating temperature range of said measurement element.

9. The measurement element as claimed in claim 6, further comprising a sheath around said optical waveguide.

10. The measurement element as claimed in claim 9, wherein said sheath is composed of a ceramic material.

11. The measurement element as claimed in claim 9, wherein said sheath is composed of metal.

12. The measurement element as claimed in claim 11, wherein said sheath forms said heating element.

13. A technical steam machine, comprising:
    a housing having stator blades rotationally fixed;
    a rotor shaft rotatably mounted in said housing;
    rotor blades arranged on said rotor shaft; and
    at least one measurement element as claimed in claim 12, arranged in a flow channel in said continuous flow machine for measurement of a fluid flow rate.

14. The technical steam machine as claimed in claim 13, wherein said at least one measurement element is arranged radially with respect to an axis of said rotor shaft in the flow channel.

15. The technical steam machine as claimed in claim 14, wherein said at least one measurement element is arranged coaxially with respect to the axis of said rotor shaft along a circular line in the flow channel.

16. The technical steam machine as claimed in claim 15, wherein said at least one measurement element includes a plurality of measurement elements arranged axially spaced apart from each other in the flow channel.

17. A method for determination of a flow rate of a fluid in a flow channel using a measurement element around which the fluid flows, comprising:
    injecting an electromagnetic wave into an optical waveguide incorporated into the measurement element and including at least two fiber Bragg gratings at different locations along a longitudinal extent of the optical waveguide, the optical waveguide having an influence on the electromagnetic wave as a function of local temperature; and
    determining the flow rate of the fluid from the influence of the optical waveguide on the electromagnetic wave where the at least two fiber Bragg gratings are located.

18. The method as claimed in claim 17, further comprising generating the electromagnetic wave by an electromagnetic pulse.

19. The method as claimed in claim 18, further comprising heating the measurement element along the longitudinal extent thereof by a heating element during measurement.

20. The method as claimed in claim 19, wherein a constant electric current is applied to the heating element.

21. The method as claimed in claim 20, further comprising repeating said heating and determining with different amounts of heat applied to obtain at least two measurements.

22. The method as claimed in claim 21, wherein said determining the flow rate of the fluid along the longitudinal extent of the measurement element is based on a difference between the at least two measurements with the different amounts of heat applied.

23. The method as claimed in claim 22, wherein a gas flow of a gas turbine is used as the fluid.

24. The technical steam machine as claimed in claim 23, further comDrising a heating element disposed along the longitudinal extent of the measurement element and heated during measurement by a constant electric current applied to said heating element,
    wherein a gas flow of a gas turbine is used as the fluid, and
    wherein the flow rate of the fluid is determined by generating the electromagnetic wave by an electromagnetic pulse; injecting an electromagnetic wave into an optical waveguide incorporated into the measurement element and including at least two fiber Bragg gratings at different locations along a longitudinal extent of the optical waveguide. the optical waveguide having an influence on the electromagnetic wave as a function of local temperature and repeatedly determining the flow rate of the fluid from the influence of the optical waveguide on the electromagnetic wave where the at least two fiber Bragg gratings are located, while heating the measurement element by said heating element applying different amounts of heat to obtain at least two measurements used to determine the flow rate of the fluid along the longitudinal extent of the measurement element based on a difference between the at least two measurements with the different amounts of heat applied.

* * * * *